US010152317B2

(12) United States Patent
Das et al.

(10) Patent No.: US 10,152,317 B2
(45) Date of Patent: Dec. 11, 2018

(54) METHOD AND SYSTEM FOR UPDATING SOFTWARE PACKAGES IN A STORAGE SYSTEM

(71) Applicant: WIPRO LIMITED, Bangalore (IN)

(72) Inventors: Rishav Das, Howrah (IN); Karanjit Singh, Tarn-Taran (IN)

(73) Assignee: WIPRO LIMITED, Bangalore (IN)

( * ) Notice: Subject to any disclaimer, the term of this patent is extended or adjusted under 35 U.S.C. 154(b) by 0 days.

(21) Appl. No.: 15/607,755

(22) Filed: May 30, 2017

(65) Prior Publication Data
US 2018/0285090 A1 Oct. 4, 2018

(30) Foreign Application Priority Data
Mar. 30, 2017 (IN) .............................. 201741011508

(51) Int. Cl.
*G06F 3/06* (2006.01)
*G06F 8/65* (2018.01)
(Continued)

(52) U.S. Cl.
CPC ................ *G06F 8/65* (2013.01); *G06F 8/656* (2018.02); *H04L 41/0813* (2013.01);
(Continued)

(58) Field of Classification Search
CPC ......... G06F 8/60–8/66; G06F 3/0662–3/0689; H04L 67/104; H04L 67/1068;
(Continued)

(56) References Cited

U.S. PATENT DOCUMENTS 5,592,625 A * 1/1997 Sandberg ............ G06F 12/1072
711/147
7,734,574 B2 * 6/2010 Dang ........................ G06F 8/65
(Continued)

OTHER PUBLICATIONS

Extended European Search Report issued in the European Patent Office in counterpart European Application No. 17186072.9, dated Mar. 14, 2018, 9 pages.

*Primary Examiner* — Todd Aguilera
(74) *Attorney, Agent, or Firm* — Finnegan, Henderson, Farabow, Garrett & Dunner, LLP

(57) ABSTRACT

A method and system are described updating software packages in a storage system. The method includes receiving software packages for upgradation of the software packages of storage arrays from the plurality of storage arrays. Each of the received software packages correspond to a storage array of the plurality of storage arrays. A time window for updating software packages of the one or more storage arrays is identified, based on an average count of input/output operations per second (IOPS) associated with each storage array. Virtual memories are allocated, within the identified time window, to a set of storage arrays from one or more storage arrays, for uploading each of the software packages. The software packages are uploaded in the allocated virtual memories. The software packages of each storage array of the set are simultaneously updated, by receiving each of the software package from the allocated virtual memory of corresponding storage array.

16 Claims, 5 Drawing Sheets

(51) Int. Cl.
  *G06F 8/656* (2018.01)
  *H04L 12/24* (2006.01)
  *H04L 29/08* (2006.01)
(52) U.S. Cl.
  CPC .............. H04L 67/34 (2013.01); *G06F 3/067* (2013.01); *G06F 3/0683* (2013.01)
(58) Field of Classification Search
  CPC ......... H04L 67/16; H04L 67/34; H04L 43/10; H04L 41/08–41/0893
  USPC ........................... 717/168–178; 709/220–222
  See application file for complete search history.

(56) References Cited

U.S. PATENT DOCUMENTS

| | | | |
|---|---|---|---|
| 7,913,246 B2* | 3/2011 | Hammond | G06F 8/65 340/538 |
| 8,881,132 B2 | 11/2014 | Mopur et al. | |
| 8,966,466 B2 | 2/2015 | Tiwari et al. | |
| 9,223,564 B2 | 12/2015 | Munireddy et al. | |
| 9,225,806 B2* | 12/2015 | Rangaraman | H04L 69/00 |
| 9,483,248 B2 | 11/2016 | Ramasamy | |
| 9,973,382 B2* | 5/2018 | Padmanabhan | H04L 67/34 |
| 2005/0144616 A1* | 6/2005 | Hammond | G06F 8/65 717/173 |
| 2006/0015861 A1 | 1/2006 | Takata et al. | |
| 2006/0184714 A1* | 8/2006 | Dang | G06F 8/65 711/100 |
| 2007/0169076 A1* | 7/2007 | Desselle | G06F 8/65 717/168 |
| 2010/0058322 A1 | 3/2010 | Oikawa et al. | |
| 2010/0229166 A1 | 9/2010 | Mopur et al. | |
| 2012/0096251 A1 | 4/2012 | Aloni et al. | |
| 2013/0339550 A1* | 12/2013 | Rangaraman | H04L 69/00 709/245 |
| 2015/0049632 A1* | 2/2015 | Padmanabhan | H04L 67/34 370/254 |

* cited by examiner

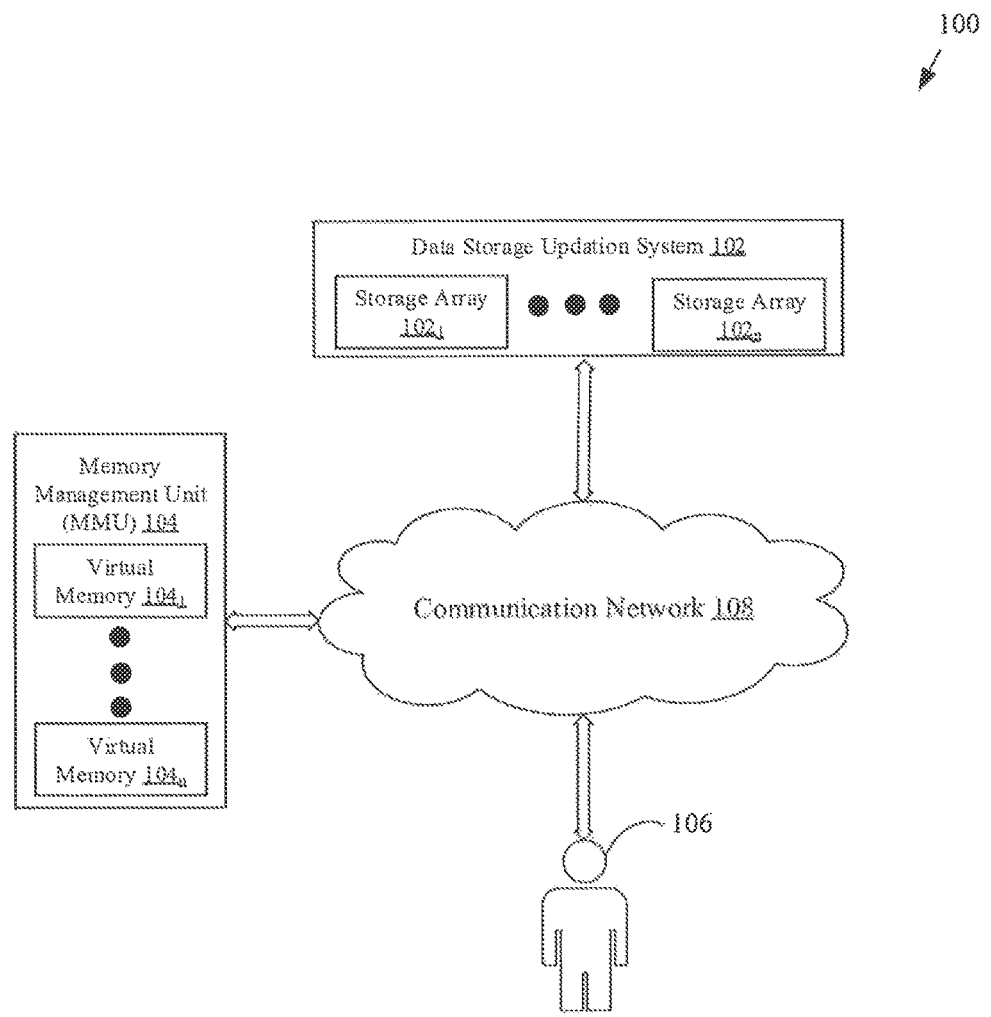
FIG. 1: System Environment 100

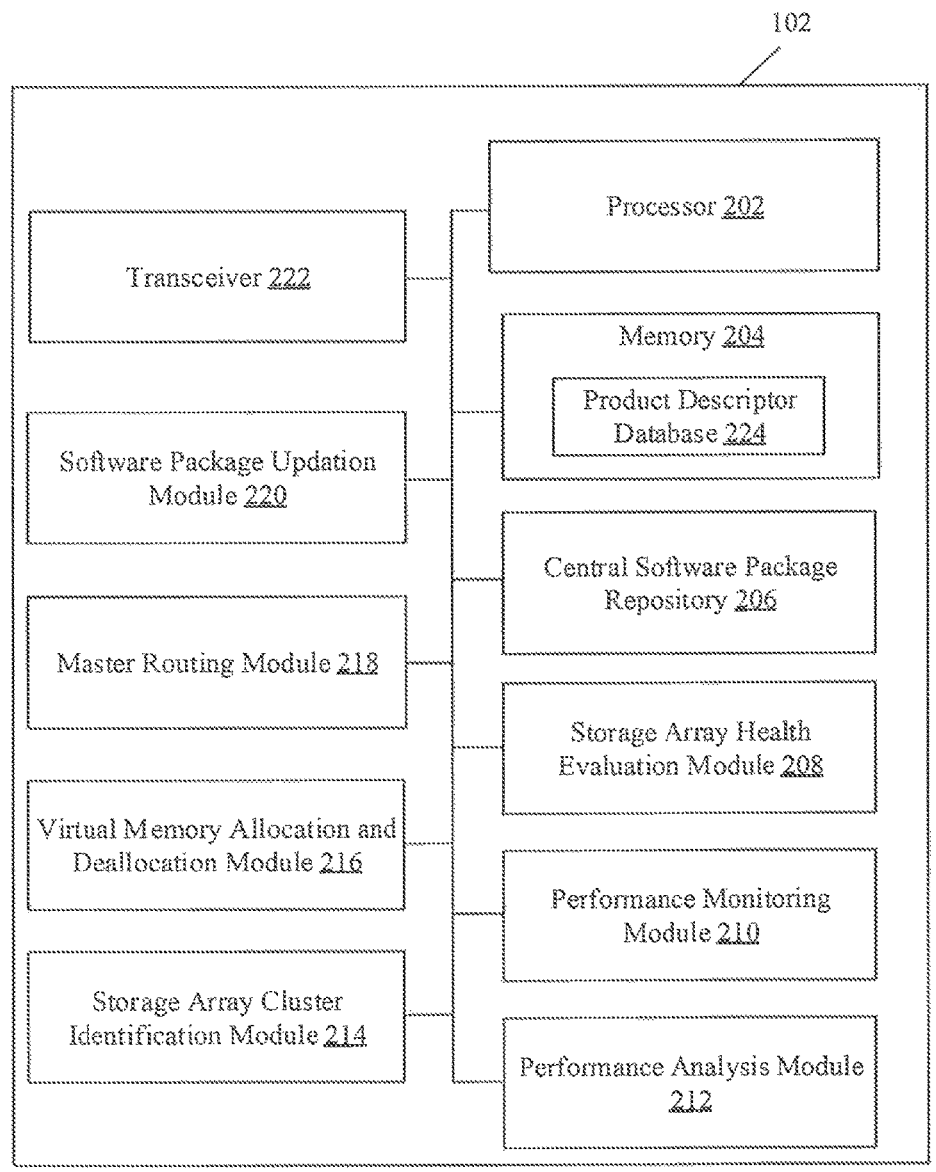
FIG. 2: Data Storage Updation Module 102

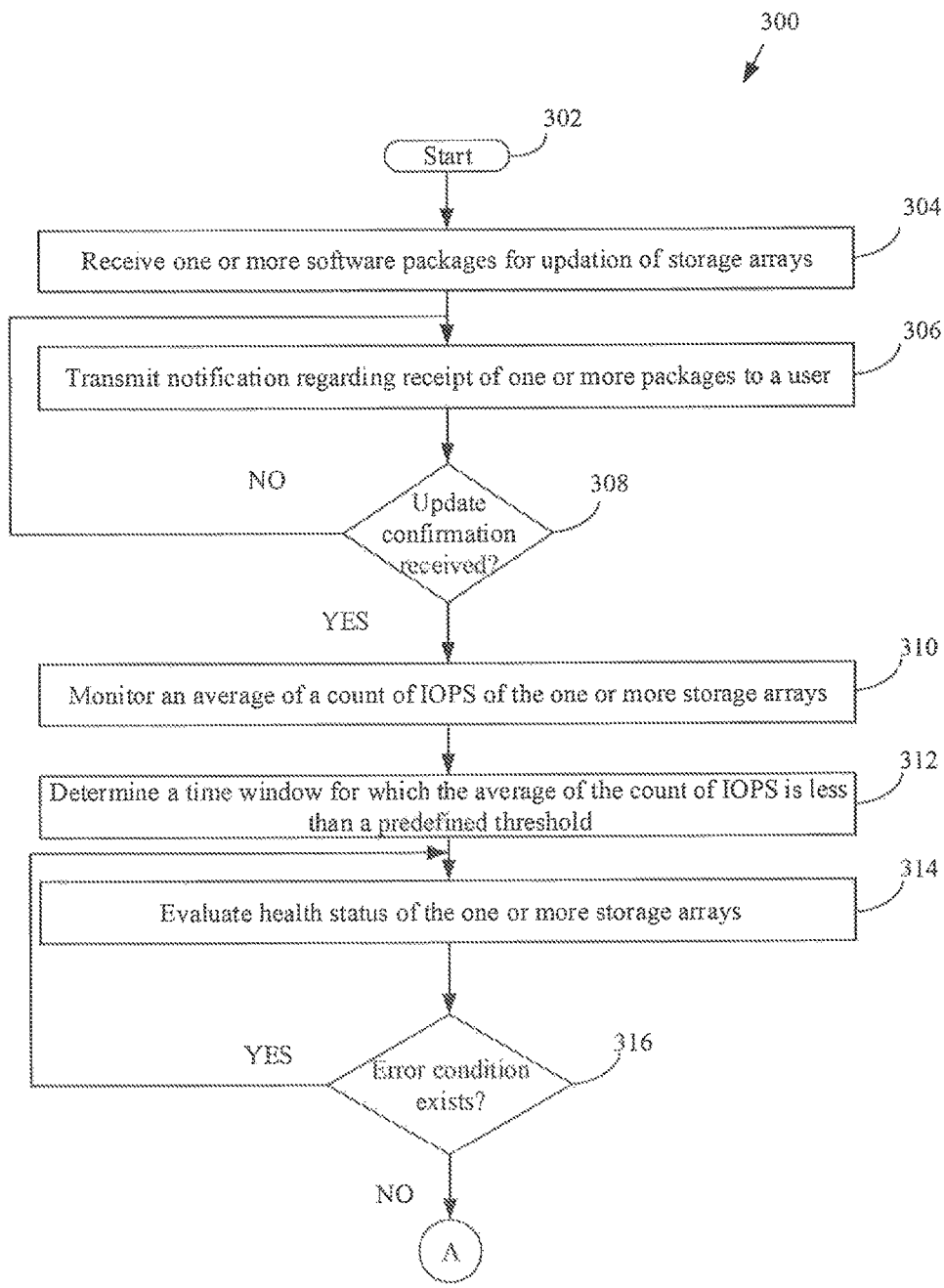
FIG. 3A: Method 300 for updating software packages in a storage system

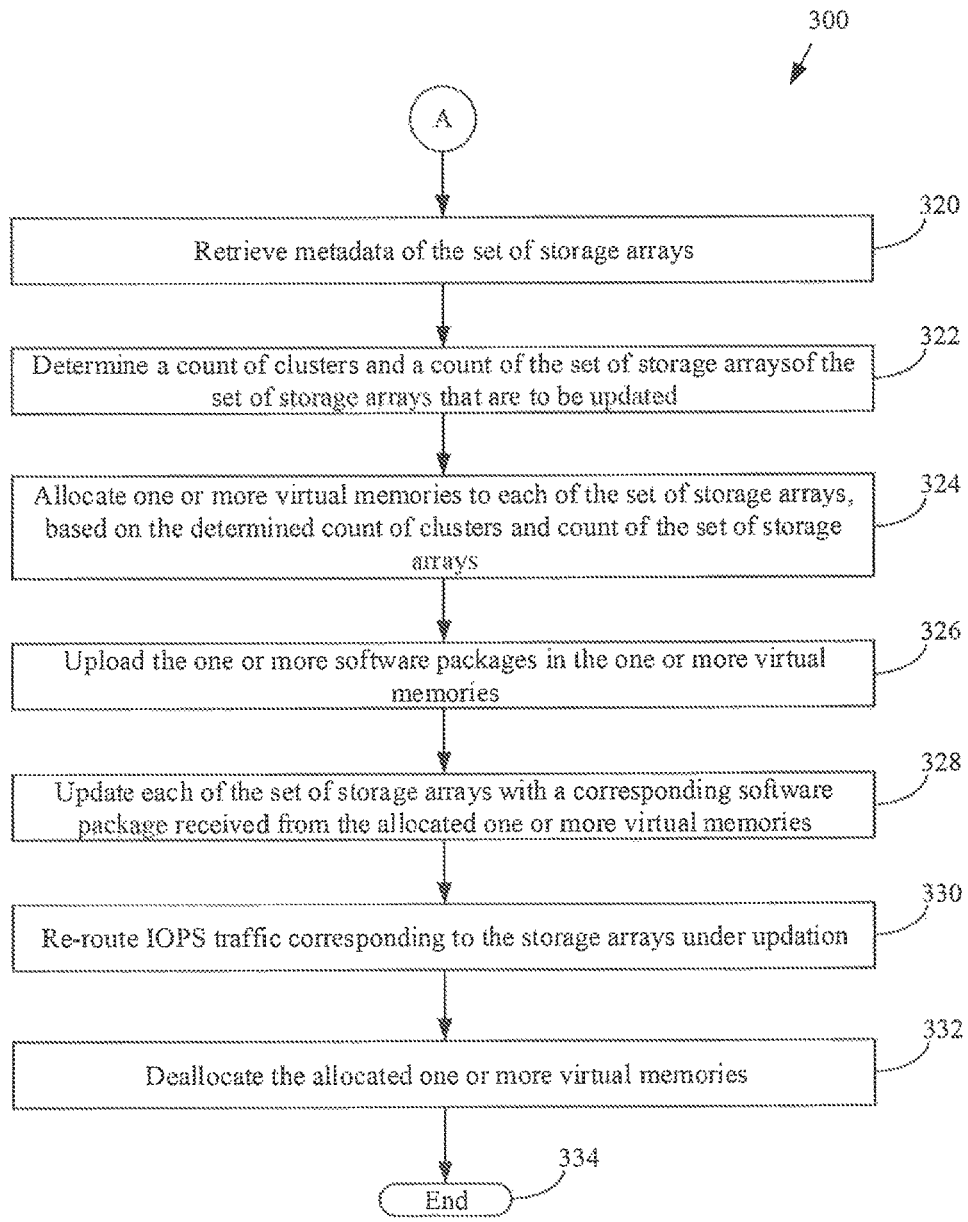
FIG. 3B: Method 300 for updating software packages in a storage system

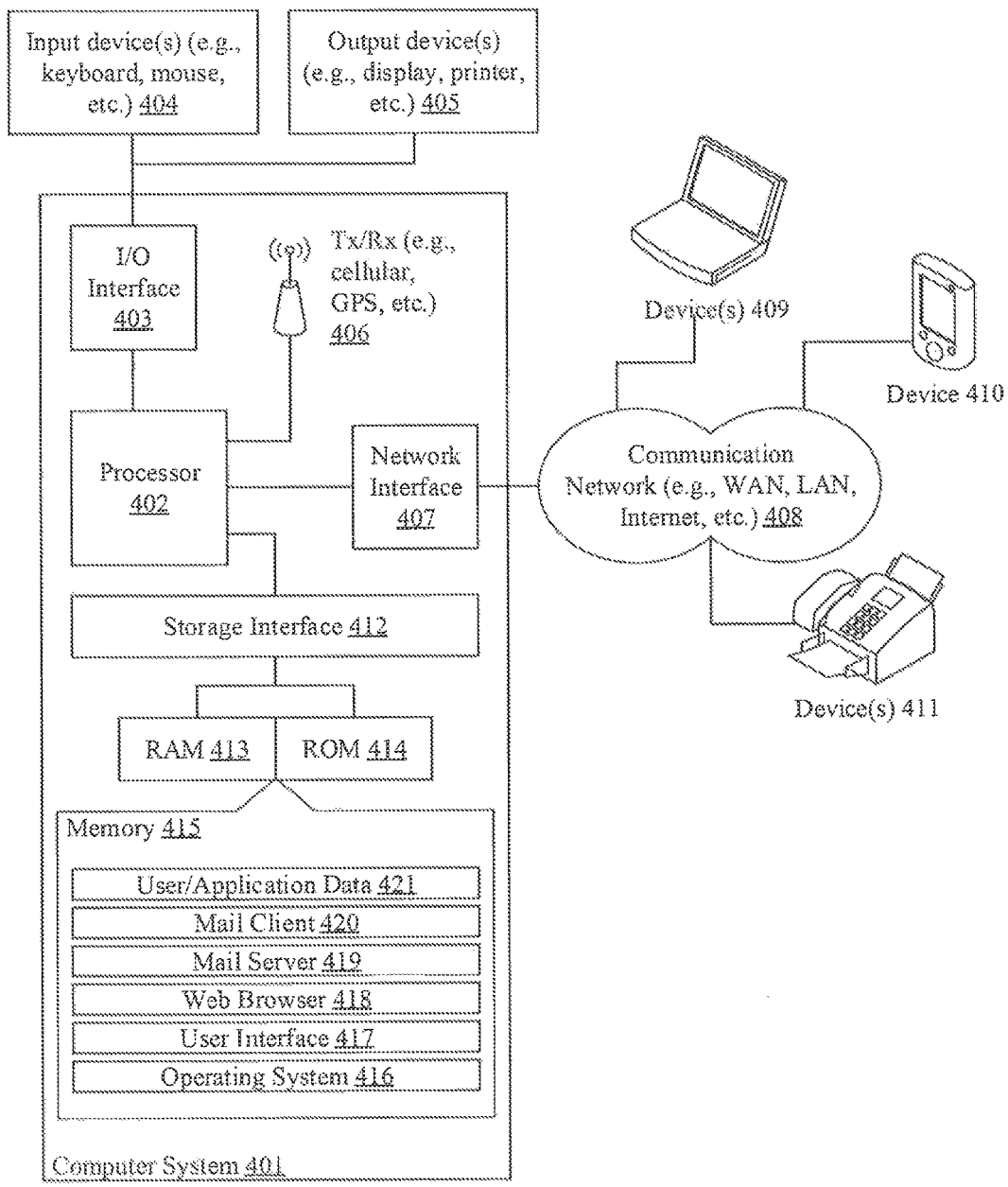
FIG. 4: Example Computer System

METHOD AND SYSTEM FOR UPDATING SOFTWARE PACKAGES IN A STORAGE SYSTEM

TECHNICAL FIELD

The present subject matter is related, in general to updating software packages, and more particularly, but not exclusively to a method and system updating software packages of storage arrays in a data storage system.

BACKGROUND

The conventional storage systems include storage arrays that have the software (or firmware) loaded on them to perform the designated operations relating to the services supported by the storage system. The uploading of the software on the storage arrays is performed by the software management servers, storage controllers, or service processors. The servers and processors are responsible for generating alerts while the controllers and the processors are responsible for handling input/output operations per second (IOPS) and other components that interconnect and work as storage system. All the aforementioned components of the storage systems have their own operating systems to run the aforementioned operation, whose software (or firmware) needs to be updated periodically according to the changing requirements of the supported services.

A conventional system for updating the software of the storage systems, such as Network Attached Storage (NAS)/Storage Area Network (SAN)/Direct Access Storage (DAS) is time consuming and error prone. In certain scenarios, during upgradation the IOPS transactions pertaining to the storage system being updated gets decreased due to the high CPU utilization. Also, post the updation, the storage system needs to be rebooted, which further leads to loss of availability of the critical services, such as online transaction processing (OLTP) services, supported by the storage system. Such a loss of services is highly avoidable as it may lead to interrupts in service provided by vendors to their customer.

In certain other scenarios, high CPU utilization during software update may lead to issues, such as kernel stuck issues, corruption of an operating system image, and/or corruption of package being updated on the storage system. In addition to the above, the aforementioned updation may require technicians to work round the clock that may drive up the overall cost involved in the maintenance required for the storage systems. Another major problem pertaining to software updation is, the difference in the process for performing updation of storage systems of different vendors. Moreover, the process of updating also varies based on the product type and/or the technology type of the storage systems. Hence, technicians of varied expertise are required for performing the updates. This further leads to increased costs for maintaining the storage systems.

It is therefore desirable to have a storage system updation mechanism that automatically performs software updates to the storage arrays, without affecting the operation or usage traffic of the services supported by the storage system.

SUMMARY

The foregoing summary is illustrative only and is not intended to be in any way limiting. In addition to the illustrative aspects, embodiments, and features described above, further aspects, embodiments, and features will become apparent by reference to the drawings and the following detailed description.

According to embodiments illustrated herein, there may be provided a method of updating software packages of a plurality of storage arrays in a data storage system. The method may include receiving, by a software updation module, one or more software packages for updation of the software packages of one or more storage arrays determined from the plurality of storage arrays. Each of the received one or more software packages corresponds to at least a storage array of the plurality of storage arrays. The method may further include identifying, by the software updation module, a time window for updating software packages of the one or more storage arrays, based on at least an average of counts of input/output operations per second (IOPS) associated with each of the one or more storage arrays. The method may further include allocating, by the software updation module, within the identified time window, one or more virtual memories to each of a set of storage arrays determined from the one or more storage arrays. The method may further include uploading, by the software updation module, each of the one or more software package for updation in the allocated virtual memory of the corresponding storage array. The method may further include updating, by the software updation module, within the identified time window, the one or more software packages of each of the set of storage arrays simultaneously, by receiving each of the one or more software packages from the allocated virtual memory of the corresponding storage array.

According to embodiments illustrated herein, there may be provided a system for updating software packages of a plurality of storage arrays in a data storage system. The system may comprise a processor and a memory communicatively coupled to the processor. The memory stores processor instructions, which, on execution, causes the processor to receive one or more software packages for updation of the software packages of one or more storage arrays determined from the plurality of storage arrays. Each of the received one or more software packages corresponds to at least a storage array of the plurality of storage arrays. The processor may be further configured to identify a time window for updating software packages of the one or more storage arrays, based on at least an average of counts of input/output operations per second (IOPS) associated with each of the one or more storage arrays. The processor may be further configured to allocate, within the identified time window, one or more virtual memories to each of a set of storage arrays determined from the one or more storage arrays. The processor may be further configured to upload each of the one or more software package for updation in the allocated virtual memory of the corresponding storage array. The processor may be further configured to update within the identified time window, the one or more software packages of each of the set of storage arrays simultaneously, by receiving each of the one or more software packages from the allocated virtual memory of the corresponding storage array.

According to embodiments illustrated herein, a non-transitory computer-readable storage medium having stored thereon, a set of computer-executable instructions for causing a computer, comprising one or more processors, to perform the operations including the steps of receiving one or more software packages for updation of the software packages of one or more storage arrays determined from the plurality of storage arrays. Each of the received one or more software packages corresponds to at least a storage array of the plurality of storage arrays. The operations may further include identifying a time window for updating software packages of the one or more storage arrays, based on at least an average of counts of input/output operations per second (IOPS) associated with each of the one or more storage arrays. The operations may further include allocating, within the identified time window, one or more virtual memories to each of a set of storage arrays determined from the one or more storage arrays. The operations may further include uploading each of the one or more software package for updation in the allocated virtual memory of the corresponding storage array. The operations may further include updating, within the identified time window, the one or more software packages of each of the set of storage arrays simultaneously, by receiving each of the one or more software packages from the allocated virtual memory of the corresponding storage array.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

FIG. 1 is a block diagram that illustrates a system environment in which various embodiments of the method and the system may be implemented;

FIG. 2 is a block diagram that illustrates a system for updating software packages of a plurality of storage arrays in a data storage system, in accordance with some embodiments of the present disclosure;

FIGS. 3A and 3B collectively depict a flowchart illustrating a method for updating software packages of a plurality of storage arrays in a data storage system, in accordance with some embodiments of the present disclosure; and FIG. 4 illustrates a block diagram of an exemplary computer system for implementing embodiments consistent with the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

The present disclosure may be best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

FIG. 1 is a block diagram that illustrates a system environment 100 in which various embodiments of the method and the system may be implemented. The system environment 100 may include a data storage updation system 102, a memory management unit (MMU) 104, and a user 106. The data storage updation system 102, the MMU 104, and the user 106 may be communicatively coupled to each other, via the communication network 108.

In an implementation, the data storage updation system 102 may include a plurality of storage arrays, such as the storage array $102_1$, $102_2$, $102_3$ ... $102_n$. Similarly, the MMU 104 may include a virtual memory $104_1$, $104_2$, $104_3$, ... $104_n$. Further, the user 106 in the network environment may correspond to a user having administrative rights for providing inputs for facilitating the updation of the software packages of one or more storage arrays of the data storage updation system 102.

In an implementation, the data storage updation system 102 may include suitable logic, circuitry, interfaces, and/or code for rendering one or more services to client, supported by the software packages installed in the plurality of storage arrays $102_1$, to $102_n$. The data storage updation system 102 may be further configured to receive one or more software packages for updation of the software packages of one or more storage arrays. Examples of implementation of the data storage updation system 102 may include, but are not limited to, a Network Attached Storage (NAS), a Storage Area Network (SAN), a Direct Access Storage (DAS), and the like.

In an implementation, the MMU 104 may include suitable logic, circuitry, interfaces, and/or code for providing virtual memories, such as $104_1$, $104_2$, $104_3$, ... $104_n$ for updating the software of the one or more storage arrays from the plurality storage arrays $102_1$, $102_2$, $102_3$, ... $102_n$. During updation, each of the storage array to be updated may be assigned a virtual memory by the MMU 104. The received software package corresponding to a storage array may be uploaded in the virtual memory assigned to the storage array. The software package may then be received from the virtual memory for updation. Examples of implementation of the MMU 104 may be based on one or more processors supporting memory management techniques, known in the art.

In an embodiment, the communication network 108 may correspond to a communication medium through which the data storage updation system 102, the MMU 104, and the user 106 may communicate with each other. Such a communication may be performed, in accordance with various wired and wireless communication protocols. Examples of such wired and wireless communication protocols include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, 2G, 3G, 4G cellular communication protocols, and/or Bluetooth (BT) communication protocols. The communication network 106 may include, but is not limited to, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN).

In operation, one or more software packages may be received by the data storage system 102 for updation of the software packages of one or more storage arrays. The storage arrays may be determined from the plurality of storage arrays $102_1$ to $102_n$. The determination of the one or more storage arrays from the plurality of storage arrays $102_1$ to $102_n$ may be based on a notification that is generated upon the receipt of the one or more software packages. Such a notification may be transmitted to the user 106, via the communication network 108. Further, the data storage system 102 may receive, from the user 106, an input comprising one or more storage arrays (such as $102_1$ to $102_7$) from the plurality of storage arrays $102_1$ to $102_1$, which are to be updated. In an embodiment, each of the plurality of storage arrays $102_1$ to $102_n$ is associated with metadata that comprises at least an identification of a storage array and an identification of one or more clusters corresponding to the storage array. Such metadata may be used to identify the target storage arrays and the clusters within the storage arrays, to which the received one or more software packages correspond.

A person of ordinary skill in the art will note that each of the received one or more software packages corresponds to at least a storage array of the plurality of storage arrays. In an embodiment, a software package from the received one or more software packages may correspond to multiple storage arrays from the plurality of storage arrays.

The data storage updation system 102 may identify a time window for updating software packages of the one or more storage arrays. In an embodiment, the identification of the time window may be based on at least an average of counts of input/output operations per second (IOPS) associated with each of the one or more storage arrays. The identified time window corresponds to a time window for which the average of the counts of IOPS is less than a predefined threshold. Further, identification of the time window for updating the software packages may be based on monitoring the average of the counts of IOPS for a predefined duration. In an embodiment, the predefined threshold and the predefined duration may be user configurable parameters. In another embodiment, the predefined threshold and the predefined duration may be determined empirically.

The data storage system 102 may further evaluate the health status of each of the storage array from the one or more storage arrays to determine a set of storage arrays (such as $102_1$, $102_3$, and/or $102_4$). The determined set of storage arrays may include the storage arrays for which no error condition is observed based on the evaluation. Alternately, in certain scenarios, the data storage updation system 102 may automatically troubleshoot an error condition observed during the evaluation of the health status of the storage arrays. In an embodiment, the health status may be evaluated based on one or more predefined health parameters that include, but are not limited to, a health status of a storage cluster of each of the one or more storage arrays, a health status of the management server, a health status of the hardware parts of the data storage system 102, a health status of the software parts of the data storage system 102.

The data storage updation system 102 may further allocate one or more virtual memories from the plurality of virtual memories $104_1$ to $104_n$, included in the MMU 104, to the set of storage arrays. In an embodiment, the allocation of the one or more virtual memories may make use of the metadata for identifying the storage arrays and the clusters, to which the one or more virtual memories are to be allocated. The allocation of the one or more memories may include determining the metadata corresponding to each of the one or more storage arrays. The allocation of one or more virtual memories may further include determining a count of virtual memories to be allocated based on a count of clusters associated with each of the one or more storage arrays. The allocation of the one or more virtual memories may further include creating a connection between each of the virtual memories and the corresponding clusters of each of the one or more storage arrays, for receiving the one or more software packages from the virtual memories, based on the determined metadata.

Based on the allocated one or more virtual memories, the data storage updation system 102 may upload each of the one or more received software packages in a virtual memory allocated to the corresponding storage array. The allocation of the one or more virtual memories may be performed within the identified time window. The data storage updation system 102 may further update the one or more software packages of each of the set of storage arrays simultaneously. The updation may be performed within the identified time window. The updation may include receiving each of the one or more software packages from the allocated virtual memory of the corresponding storage array.

In an embodiment, the data storage system 102 may deallocate the one or more virtual memories upon completion of the updation of the one or more software packages of each of the set of storage arrays. A person of ordinary skill in the art will appreciate that in an embodiment, the updation of the software packages in the storage arrays may include a software upgrade operation where a software of higher version is updated in the storage arrays. In another embodiment, the updation of the software packages in the storage arrays may include a software downgrade operation where a software of lower version is updated in the storage arrays.

In an embodiment, the data storage updation system 102 may further re-route an upcoming traffic corresponding to the set of storage arrays that are being updated. The destination of the re-routed traffic may be another set of storage arrays from the plurality of storage arrays $102_1$ to $102_n$, for which the one or more software packages are not received. In another embodiment, the re-routing destination of the re-routed traffic may be a set of clusters within the storage arrays of the set of storage arrays that are not undergoing the process of updation of the software package.

FIG. 2 is a block diagram that illustrates a data storage updation system 102 for updating software packages of a plurality of storage arrays in a data storage system, in accordance with some embodiments of the present disclosure.

The data storage updation system 102 includes a processor 202, a memory 204, a central software package repository 206, a storage array health evaluation module 208, a performance monitoring module 210, a performance analysis module 212, a storage array cluster identification module 214, a virtual memory allocation and deallocation module 216, a master routing module 218, a software package updation module 220, and/or a transceiver 222. Further, in an embodiment, the memory 204 may include a product descriptor database 224. The processor 202 may be communicatively coupled to the memory 204, the central software package repository 206, the storage array health evaluation module 208, the performance monitoring module 210, the performance analysis module 212, the storage array cluster identification module 214, the virtual memory allocation and deallocation module 216, the master routing module 218, the software package updation module 220, and/or the transceiver 222.

The processor 202 includes suitable logic, circuitry, interfaces, and/or code that may be configured to execute a set of instructions stored in the memory 204. The processor 202 may be implemented based on a number of processor technologies known in the art. Examples of the processor 202 include, but not limited to, an X86-based processor, a Reduced Instruction Set Computing (RISC) processor, an Application-Specific Integrated Circuit (ASIC) processor, a Complex Instruction Set Computing (CISC) processor, and/or other processor.

The memory 204 includes suitable logic, circuitry, interfaces, and/or code that may be configured to store the set of instructions, which may be executed by the processor 202. In an embodiment, the memory 204 may be configured to store one or more programs, routines, or scripts that may be executed in coordination with the processor 202. The memory 204 may be implemented based on a Random Access Memory (RAM), a Read-Only Memory (ROM), a Hard Disk Drive (HDD), a storage server, and/or a Secure Digital (SD) card.

The central software package repository 206 includes suitable logic, circuitry, interfaces, and/or code that may be configured to receive and store one or more software packages (software codes) released by the vendors of each storage array of the plurality of storage arrays $102_1$ to $102_n$. The central software package repository 206 further notifies the user 106 about the receipt of the software codes. The central software package repository 206 further receives confirmation from the user 106 regarding the updation of one or more storage arrays of the plurality of storage arrays $102_1$ to $102_n$, with the received software codes.

The storage array health evaluation module 208 includes suitable logic, circuitry, interfaces, and/or code that may be configured to evaluate the health status of each of the one or more storage arrays for which upgradation is confirmed by the user 106. The health evaluation of each of the one or more storage arrays is performed based on execution of the health check script provided by a vendor of a storage array using the respective storage management port. Such scripts may be stored in the memory 204. The evaluation may further be based on inputs provided by a user, such as the user 106.

The performance monitoring module 210 includes suitable logic, circuitry, interfaces, and/or code that may be configured to monitor the average of the counts of IOPS for a predefined duration. The performance monitoring module 210 may be further configured to retrieve the predefined duration of monitoring from the memory 204. The performance monitoring module 210 may be further configured to transmit the results of the monitoring to the performance analysis module 212.

The performance analysis module 212 includes suitable logic, circuitry, interfaces, and/or code that may be configured to analyze the received result of the monitoring to identify a time window for updating the software packages of the one or more storage arrays. The analysis may be based on determining a window in which the average of the counts of IOPS is less than a predefined threshold. Such a predefined threshold may be stored in the memory 204.

The storage array cluster identification module 214 includes suitable logic, circuitry, interfaces, and/or code that may be configured to determine metadata corresponding to each of a set of storage arrays (identified from the one or more storage arrays). The storage array cluster identification module 214 may be further configured to determine metadata of the one or more clusters of the set of storage arrays that are to be updated. To that end, the storage array cluster identification module 214 may retrieve the identification of a storage array and an identification of one or more clusters corresponding to the storage array from the product descriptor database 224.

The virtual memory allocation and deallocation module 216 includes suitable logic, circuitry, interfaces, and/or code that may be configured to allocate one or more virtual memories to each of the set of storage arrays that are to be updated. The virtual memory allocation and deallocation module 216 may be configured to determine a count of the virtual memories that are to be allocated. The virtual memory allocation and deallocation module 216 may be configured to create a connection between each of the virtual memories and the corresponding clusters of each of the set of storage arrays, for receiving the one or more software packages. The virtual memory allocation and deallocation module 216 may be configured to deallocate the allocated on or more virtual memories once the updation is complete.

The master routing module 218 includes suitable logic, circuitry, interfaces, and/or code that may be configured to re-route an upcoming traffic corresponding to the set of storage arrays that bare undergoing an updation. The master routing module 218 may be further configured to track another set of storage arrays from the plurality of storage arrays $102_1$ to $102_n$ that are not undergoing the updation. Based on the tracking, the master routing module 218 may be configured to divert the incoming traffic to the tracked another set of storage arrays.

The software package updation module 220 includes suitable logic, circuitry, interfaces, and/or code that may be configured to receive each of the one or more software packages from the allocated virtual memory of the corresponding storage array. The software package updation module 220 may be further configured to update the one or more software packages of each of the set of storage arrays simultaneously.

The transceiver 222 includes of suitable logic, circuitry, interfaces, and/or code that may be configured to receive the inputs from the user 106, via the communication network 108. The transceiver 222 may be further configured to facilitate the communication regarding the allocation and deallocation of the one or more virtual memories of the MMU 104, between the data storage updation system 102 and the MMU 104. The transceiver 222 may be implemented based on one or more known technologies to support wired or wireless communication with the communication network. In an embodiment, the transceiver 222 may include, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The transceiver 222 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as: Global System for Mobile Communications (GSM), Enhanced Data GSM Environment (EDGE), wideband code division multiple access (W-CDMA), code division multiple access (CDMA), time division multiple access (TDMA). Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

In operation, the central software package repository 206 may be configured to receive one or more software packages for updation of the software packages of one or more storage arrays. In an embodiment, each of the storage array of the plurality of storage arrays $102_1$ to $102_n$ may correspond to a vendor from which a software package (of the received one or more software packages) is received.

In an embodiment, each of the plurality of storage arrays $102_1$ to $102_n$ may be associated with metadata that comprises at least an identification of a storage array and an identification of one or more clusters corresponding to the storage array. Such metadata may be used by the storage array cluster identification module 214 to identify the target storage arrays and the clusters within the storage arrays, to which the received one or more software packages correspond. In an embodiment, the metadata may be stored in the product descriptor database 224 of the memory 204.

In an embodiment, the one or more storage arrays that are to be updated may be determined from the plurality of storage arrays $102_1$ to $102_n$. In an embodiment, the processor 202 in conjunction with the central software package repository 206 may be configured to notify a user (such as the user 106) about the receipt of the one or more software package. Such a notification may be transmitted to the user 106, via the transceiver 222. In an embodiment, the notification may be transmitted to a management server (not shown) that may relay it to the user 106.

The processor 202 may be configured to receive, from the user 106, an input comprising a one or more storage arrays from the plurality of storage arrays $102_1$ to $102_n$, which are to be updated.

In an embodiment, the processor 202 in conjunction with the performance monitoring module 210 may be configured to monitor the IOPS of the one or more storage arrays for the predefined duration. Based on the monitoring, the processor 202 in conjunction with the performance analysis module 212 may be configured to determine an average of the counts of IOPS of the one or more storage arrays. Based on the determined average, the performance analysis module 212 may be configured to identify a time window for which the average of the counts of IOPS is less than the predefined threshold. In an embodiment, the predefined threshold and the predefined duration may be user configurable parameters. In another embodiment, the predefined threshold and the predefined duration may be determined empirically.

The processor 202 in conjunction with the storage array health evaluation module 208 may be configured to evaluate the health status of each of the storage array from the one or more storage arrays (such as $102_1$ to $102_n$). The evaluation may be aimed at determining the set of storage arrays (such as $102_1$, $102_3$, and/or $102_4$) that could be updated with a corresponding software package received by the central software package repository 206. In an embodiment, the health status may be evaluated based on one or more predefined health parameters that include, but are not limited to, a health status of a storage cluster of each of the one or more storage arrays, a health status of the management server, a health status of the hardware parts of the data storage system 102, a health status of the software parts of the data storage system 102. The evaluation may be based on the one or more scripts stored in the memory 204.

In an embodiment, the storage array health evaluation module 208 may be configured to check different health status of different cluster by performing basic error checks which can be resolved automatically by the processor 202. This may further depend on a respective vendor therefore, for each vendor and corresponding architecture, such a functionality may be stored in the form of a program. In scenarios when the processor 202 identifies any error, it notifies the user 106 in order to seek confirmation for proceeding further. In another scenario, if the storage array is healthy and fetches no error, then processor 202 may directly query the product descriptor database 224 to determine the identification the set of storage arrays as well as corresponding identification of one or more clusters in the one or more storage arrays. Based on the evaluation, the processor 202 may be configured to determine the set of storage arrays that could be updated.

In an embodiment, based on the identified time window, the received one or more software packages corresponding to the set of storage arrays may be automatically pushed to a management server management server (not shown). In another embodiment, the processor 202 in conjunction with the storage array cluster identification module 214 may be configured to retrieve the metadata of the set of storage arrays that are to be updated. The retrieved metadata may include unique addresses of the storage arrays and/or the addresses of the one or more clusters of the set of storage arrays.

Based on the retrieved metadata, the processor 202 in conjunction with the virtual memory allocation and deallocation module 216 may be configured to allocate one or more virtual memories from the plurality of virtual memories $104_1$ to $104_n$ to the set of storage arrays. The allocation of the one or more virtual memories may include creating a connection between each of the virtual memories and the corresponding clusters of each of the set of storage arrays, for receiving the one or more software packages from the virtual memories, based on the determined metadata. Based on the allocated one or more virtual memories, the virtual memory allocation and deallocation module 216 may be configured to upload each of the one or more received software packages in a virtual memory allocated to the corresponding storage array. A person of ordinary skill in the art will appreciate that the allocation of the one or more virtual memories may be performed within the identified time window.

In an embodiment, while upgrading a storage arrays, huge amount of memory may be required. The allocation of virtual memory is therefore desirable in such a scenario such that virtual memory is shared using the memory-ID of each memory chunk allocated to different vendors and users. As a consequence, the while the one or more software packages are uploaded using the allocated one or more virtual memories, the storage array does not hang, thereby overcoming issues, such as latency issue and/or crashing issues. Further, such an allocation results in sharing of resources and computation cycles, which is a desirable aspect in such systems.

In an embodiment, the processor 202 in conjunction with the package updation module 220 may be configured to receive the one or more software packages for updation, from the allocated one or more virtual memories. In another embodiment, the package updation module 220 may be configured to receive the one or more software packages for updation from the management server (not shown). Based on the received one or more software packages, the package updation module 220 may be configured to update the one or more software packages of each of the set of storage arrays simultaneously. The updation may be performed within the identified time window.

A person of ordinary skill in the art will appreciate that in an embodiment, the updation of the software packages in the storage arrays may include a software upgrade operation where a software of higher version is updated in the storage arrays. In another embodiment, the updation of the software packages in the storage arrays may include a software downgrade operation where a software of lower version is updated in the storage arrays.

In an embodiment, the processor 202 in conjunction with the virtual memory allocation and deallocation module 216 may be configured to deallocate the one or more virtual memories upon completion of the updation of the one or more software packages of each of the set of storage arrays.

In an embodiment, the processor 202 in conjunction with the master routing module 218 may be configured to re-route an upcoming traffic corresponding to the set of storage arrays that are being updated. The destination of the re-routed traffic may be another set of storage arrays from the plurality of storage arrays $102_1$ to $102_n$, for which the one or more software packages are not received. As an example, the storage arrays $102_8$ to $102_n$ may correspond to storage arrays to which a suddenly arrived IOPS traffic may be routed. In another embodiment, the re-routing destination of the re-routed traffic may be a set of clusters within the storage arrays ($102_8$ to $102_n$) that are not undergoing the process of updation of the software package. In an embodiment, the re-routing of the IOPS may be performed based on one or more machine learning algorithm, known in the art.

FIGS. 3A and 3B collectively depict a flowchart illustrating a method 300 for updation of software packages of a plurality of storage arrays in a data storage system, in accordance with some embodiments of the present disclosure. The method starts at step 302 and proceeds to step 304.

At step 304, one or more software packages for upgradation of the software packages of one or more storage arrays may be received by the data storage updation system 102. The one or more storage arrays determined from the plurality of storage arrays. Further, each of the received one or more software packages corresponds to at least a storage array of the plurality of storage arrays.

At step 306, a notification regarding the receipt of one or more software packages may be transmitted to a user, such as the user 106, by the data storage updation system 102. Such software packages may correspond to a new version of a software package has been released by an engineering team, for upgradation. In an embodiment, the notification may be transmitted to the user 106 via the storage management server 310 that is responsible to take care of all the alerts.

At step 308, it may be determined, by the data storage updation system 102, whether a confirmation for updation of the one or more of storage arrays (from the plurality of storage arrays) is received from the user 106. In instances, when a positive confirmation is received, the control passes to step 310. In instances, when a negative confirmation is received, the control passes back to step 306.

At step 310, a monitoring of an average of a count of IOPS of the one or more storage arrays may be performed by the data storage updation system 102, for a predefined duration. At step 312, a time window may be determined by the data storage updation system 102, for which the average of the count of TOPS is less than a predefined threshold.

At step 314, a health status of the one or more storage arrays may be evaluated by the data storage updation system 102, to determine a set of storage arrays that may be updated with the received one or more software packages. At step 316, it may be determined whether an error condition exists in a storage array based on the evaluation. In instances when an error condition exists, the error condition is resolved using troubleshooting operation performed at step 318. The control passes to step 316.

At step 320, metadata of the set of storage arrays may be retrieved from the memory 204. At step 322, a count of clusters of the set of storage arrays, and a count of the set of storage arrays, may be determined. At step 324, one or more virtual memories may be allocated to each of the set of storage arrays, based on the determined count of the clusters and count of the set of storage arrays. At step 326, one or more received software packages may be uploaded on the allocated one or more virtual memories.

At step 328, the updating of the one or more software packages may be performed on the set of storage arrays based on reception of a software package of a storage array, from a corresponding virtual memory. At step 330, the IOPS traffic corresponding to the set of storage arrays may be re-routed to the remaining storage arrays from the plurality of storage arrays, which are not undergoing updation. At step 332, the one or more virtual memories may be deallocated after the completion of the updation. Control passes to end step 334.

Computer System

FIG. 4 illustrates a block diagram of an exemplary computer system for implementing embodiments consistent with the present disclosure. Variations of computer system 401 may be used for performing optical character recognition on an image including a plurality of printed characters. The computer system 401 may comprise a central processing unit ("CPU" or "processor") 402. Processor 402 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD ATHLON, DURON or OPTERON, ARM's application, embedded or secure processors, IBM POWERPC, INTEL'S CORE, ITANIUM, XEON, CELERON or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-VIDEO, VGA, IEEE 802.n/b/g/n/x, BLUETOOTH, cellular (e.g., code-division multiple access (CDMA), high-speed packet access (HSPA+), global system for mobile communications (GSM), long-term evolution (LTE), WiMAX, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., TEXAS INSTRUMENTS WiLink WL1283, BROADCOM BCM4750IUB8, INFINEON TECHNOLOGIES X-GOLD 618-PMB9800, or the like), providing IEEE 802.11a/b/g/n, BLUETOOTH, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 409, 410, and 411. These devices may include, without limitation, personal computer(s), server(s), fax machines, printers, scanners, various mobile devices such as cellular telephones, smartphones (e.g., APPLE IPHONE, BLACKBERRY, ANDROID-based phones, etc.), tablet computers, eBook readers (AMAZON KINDLE, NOOK, etc.), laptop computers, notebooks, gaming consoles (MICROSOFT XBOX, NINTENDO DS, SONY PLAYSTATION, etc.), or the like. In some embodiments, the computer system 501 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory 415 may store a collection of program or database components, including, without limitation, an operating system 416, user interface application 417, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, APPLE Macintosh OS X, UNIX, UNIX-like system distributions (e.g., Berkeley Software Distribution (BSD), FreeBSD®, NetBSD®, OpenBSD®, etc.), Linux distributions (e.g., RED HAT, UBUNTU, KUBUNTU, etc.), IBM OS/2, MICROSOFT WINDOWS (XP, Vista/7/8, etc.), APPLE iOS, GOOGLE ANDROID, BLACKBERRY OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, APPLE Macintosh operating systems' Aqua, IBM OS/2, MICROSOFT WINDOWS (e.g., AERO, METRO, etc.), UNIX X-Windows, web interface libraries (e.g., ActiveX, Java, Javascript, AJAX, HTML, Adobe Flash, etc.), or the like.

In some embodiments, the computer system 401 may implement a web browser 418 stored program component. The web browser may be a hypertext viewing application, such as MICROSOFT INTERNET EXPLORER, GOOGLE CHROME, MOZILLA FIREFOX, APPLE SAFARI, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE FLASH, JAVASCRIPT, JAVA, application programming interfaces (APIs), etc. In some embodiments, the computer system 401 may implement a mail server 419 stored program component. The mail server may be an Internet mail server such as Microsoft Exchange, or the like. The mail server may utilize facilities such as ASP, ActiveX, ANSI C++/C#, MICROSOFT .NET, CGI scripts, JAVA, JAVASCRIPT, PERL, PHP, PYTHON, WebObjects, etc. The mail server may utilize communication protocols such as Internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. as described in this disclosure. Such databases may be implemented as fault-tolerant, relational, scalable, secure databases such as ORACLE or SYBASE. Alternatively, such databases may be implemented using standardized data structures, such as an array, hash, linked list, struct, structured text file (e.g., XML), table, or as object-oriented databases (e.g., using OBJECTSTORE, POET, ZOPE, etc.). Such databases may be consolidated or distributed, sometimes among the various computer systems discussed above in this disclosure. It is to be understood that the structure and operation of the any computer or database component may be combined, consolidated, or distributed in any working combination.

The advantages of the disclosed method and system include the error handling capabilities of the system during a software update of storage systems. Further, the disclosed technique enables diversion of traffic to storage arrays not undergoing the update. This saves the system from any crashes that may happened due to an influx of a large volume of traffic at the time of updation. The aforementioned further allocates virtual memories in for updation. This helps in overcoming the crash issues and the network latency issues.

This is because the software updation is a memory intensive process that may drain out the memory from the system during updates. Under such circumstances the presence of a virtual memory provides extra shared resources that may prevent the system from encountering the aforementioned issue. Furthermore, the disclosed technique is method for a simultaneous automatic update of software of storage arrays that may correspond to various vendors. The disclosed technique performs troubleshooting before upgrading and thus enables a reduction in the troubleshooting workloads. Additionally, most of times while updation, the storage system needs to shut down. But with the help of disclosed technique no such shut down will be required.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise. The terms "including", "comprising", "having" and variations thereof mean "including but not limited to", unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like. The claims can encompass embodiments for hardware and software, or a combination thereof.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method of updating software packages of a plurality of storage arrays in a data storage system, the method comprising:
    receiving, by a hardware processor, one or more software packages for updation of the software packages of one or more storage arrays determined from the plurality of storage arrays, wherein each of the received one or more software packages corresponds to at least a storage array of the plurality of storage arrays, and wherein each of the plurality of storage arrays is associated with metadata that comprises at least an identification of a storage array and an identification of one or more clusters corresponding to the storage array;
    identifying, by the hardware processor, a time window for updating software packages of the one or more storage arrays, based on at least an average of counts of input/output operations per second (IOPS) associated with each of the one or more storage arrays;
    allocating, by the hardware processor, within the identified time window, one or more virtual memories to each of a set of storage arrays determined from the one or more storage arrays, wherein the allocation is based on:
        determining the metadata corresponding to, each of the set of storage arrays;
        determining a count of virtual memories to be allocated based on a count of clusters associated with each of the one or more storage arrays; and creating a connection between each of the virtual memories and the corresponding clusters of each of the one or more storage arrays, for receiving the one or more software packages from the one or more virtual memories;

uploading, by the hardware processor, each of the one or more software package for updation in the allocated virtual memory of the corresponding storage array; and updating, by the hardware processor, within the identified time window, the one or more software packages of each of the set of storage arrays simultaneously, by receiving each of the one or more software packages from the allocated virtual memory of the corresponding storage array.

2. The method of claim 1, wherein the determination of the one or more storage arrays from the plurality of storage arrays is based on:

notifying a user upon the receipt of the one or more software packages for updation of the one or more software packages of one or more storage arrays from the plurality of storage arrays; and receiving, from the user, an input comprising the one or more storage arrays from the plurality of storage arrays, which are to be updated.

3. The method of claim 1, wherein the determination of the set of storage arrays is based on an evaluation of the health status of each of the storage array from the set of storage arrays.

4. The method of claim 3, wherein the evaluation of the health status is based on one or more predefined health parameters.

5. The method of claim 1, wherein the identified time window corresponds to a time window for which the average of the counts of IOPS is less than a predefined threshold.

6. The method of claim 1, wherein the identification of the time window for updating the software packages is based on monitoring the average of the counts of IOPS for a predefined duration.

7. The method of claim 1, further comprising re-routing upcoming traffic corresponding to the one or more storage arrays to another set of storage arrays from the plurality of storage arrays, for which the one or more software packages are not received.

8. The method of claim 1, further comprising deallocating the one or more virtual memories upon completion of the updation of the one or more software packages of each of the set of storage arrays.

9. A system for updating software packages of a plurality of storage arrays in a data storage system, the system comprising:

a processor; and a memory communicatively coupled to the processor, wherein the memory stores processor instructions, which, on execution, causes the processor to:

receive one or more software packages for updation of the software packages of one or more storage arrays determined from the plurality of storage arrays, wherein each of the received one or more software packages corresponds to at least a storage array of the plurality of storage arrays, and wherein each of the plurality of storage arrays is associated with metadata that comprises at least an identification of a storage array and an identification of one or more clusters corresponding to the storage array;

identify a time window for updating software packages of the one or more storage arrays, based on at least an average of counts of input/output operations per second (IOPS) associated with each of the one or more storage arrays;

allocate within the identified time window, one or more virtual memories to each of a set of storage arrays determined from the one or more storage arrays, wherein the allocation is based on:

determining the metadata corresponding to each of the set of storage arrays:

determining a count of virtual memories to be allocated based on a count of clusters associated with each of the one or more storage arrays; and creating a connection between each of the virtual memories and the corresponding clusters of each of the one or more storage arrays, for receiving the one or more software packages from the one or more virtual memories;

upload each of the one or more software package for updation in the allocated virtual memory of the corresponding storage array; and update within the identified time window, the one or more software packages of each of the set of storage arrays simultaneously, by receiving each of the one or more software packages from the allocated virtual memory of the corresponding storage array.

10. The system of claim 9, wherein the determination of the one or more storage arrays from the plurality of storage arrays is based on:

notifying a user upon the receipt of the one or more software packages for updation of the one or more software packages of one or more storage arrays from the plurality of storage arrays; and receiving, from the user, an input comprising a set of storage arrays from the plurality of storage arrays, which are to be updated.

11. The system of claim 9, wherein the determination of the set of storage arrays is based on an evaluation of the health status of each of the storage array from the set of storage arrays to determine the one or more storage arrays, and wherein the evaluation of the health status is based on one or more predefined health parameters.

12. The system of claim 9, wherein the identified time window corresponds to a time window for which the average of the counts of IOPS is less than a predefined threshold.

13. The system of claim 9, wherein the identification of the time window for updating the software packages is based on monitoring the average of the counts of IOPS for a predefined duration.

14. The system of claim 9, wherein the processor is further configured to re-route upcoming traffic corresponding to the one or more storage arrays to another set of storage arrays from the plurality of storage arrays, for which the one or more software packages are not received.

15. The system of claim 9, further comprising deallocating the one or more virtual memories upon completion of the updation of the set of software packages of each of the one or more storage arrays.

16. A non-transitory computer-readable storage medium for updating software packages of a plurality of storage arrays in a data storage system, having stored thereon, a set of computer-executable instructions for causing a computer comprising one or more processors to perform steps comprising:

receiving one or more software packages for updation of the software packages of one or more storage arrays determined from the plurality of storage arrays, wherein each of the received one or more software packages corresponds to at least a storage array of the plurality of storage arrays, and wherein each of the plurality of storage arrays is associated with metadata that comprises at least an identification of a storage array and an identification of one or more clusters corresponding to the storage array;

identifying a time window for updating software packages of the one or more storage arrays, based on at least an average of counts of input/output operations per second (IOPS) associated with each of the one or more storage arrays;

allocating within the identified time window, one or more virtual memories to each of a set of storage arrays determined from the one or more storage arrays, wherein the allocation is based on:

determining the metadata corresponding to each of the set of storage arrays;

determining a count of virtual memories to be allocated based on a count of clusters associated with each of the one or more storage arrays; and creating a connection between each of the virtual memories and the corresponding clusters of each of the one or more storage arrays, for receiving the one or more software packages from the one or more virtual memories;

uploading each of the one or more software package for updation in the allocated virtual memory of the corresponding storage array; and updating within the identified time window, the one or more software packages of each of the set of storage arrays simultaneously, by receiving each of the one or more software packages from the allocated virtual memory of the corresponding storage array.

* * * * *